(12) United States Patent
Han et al.

(10) Patent No.: US 10,348,796 B2
(45) Date of Patent: Jul. 9, 2019

(54) ADAPTIVE VIDEO STREAMING OVER PREFERENCE-AWARE MULTIPATH

(71) Applicant: AT&T Intellectual Property I, L.P., Atlanta, GA (US)

(72) Inventors: Bo Han, Bridgewater, NJ (US); Lusheng Ji, Randolph, NJ (US); Vijay Gopalakrishnan, Edison, NJ (US); Feng Qian, Bloomington, IN (US)

(73) Assignees: AT&T Intellectual Property I, L.P., Atlanta, GA (US); Indiana University Research and Technology Corporation, Indianapolis, IN (US)

( * ) Notice: Subject to any disclaimer, the term of this patent is extended or adjusted under 35 U.S.C. 154(b) by 157 days.

(21) Appl. No.: 15/374,512

(22) Filed: Dec. 9, 2016

(65) Prior Publication Data

US 2018/0167436 A1    Jun. 14, 2018

(51) Int. Cl.
| | | |
|---|---|---|
| *H04L 29/06* | (2006.01) | |
| *H04L 12/26* | (2006.01) | |
| *H04L 12/707* | (2013.01) | |
| *H04L 12/891* | (2013.01) | |
| *H04L 29/08* | (2006.01) | |

(52) U.S. Cl.
CPC .......... *H04L 65/80* (2013.01); *H04L 43/0858* (2013.01); *H04L 43/0888* (2013.01); *H04L 43/16* (2013.01); *H04L 45/24* (2013.01); *H04L 47/41* (2013.01); *H04L 65/604* (2013.01); *H04L 43/0876* (2013.01); *H04L 67/02* (2013.01)

(58) Field of Classification Search
CPC ...... H04L 43/0858; H04L 47/41; H04L 45/24
See application file for complete search history.

(56) References Cited

U.S. PATENT DOCUMENTS

| | | | | |
|---|---|---|---|---|
| 7,577,763 | B1 * | 8/2009 | Beaman | G06F 3/061 |
| | | | | 710/6 |
| 8,169,916 | B1 * | 5/2012 | Pai | H04N 21/2181 |
| | | | | 370/236 |
| 8,554,941 | B2 * | 10/2013 | Rannakrishnan | H04N 7/17318 |
| | | | | 709/203 |
| 9,326,132 | B2 | 4/2016 | Salkintzis et al. | |
| 9,369,513 | B2 | 6/2016 | Zhao et al. | |

(Continued)

OTHER PUBLICATIONS

Puttaswamy Gowda Chowrikoppalu, Yashavanth. "Multipath Adaptive video Streaming over Multipath TCP". Dated Mar. 2013. pp. 1-110.

*Primary Examiner* — Lashonda T Jacobs

(57) ABSTRACT

A processor performing functions of a video client may measure an occupancy of a video buffer, select a video chunk having a first video encoding bitrate based upon the occupancy, and provide a deadline for a delivery of the video chunk to a multipath transport layer module. The processor may further activate a deadline aware scheduler of the module when the occupancy exceeds a first threshold and when the deadline aware scheduler was previously disabled, and deactivate the deadline aware scheduler when the occupancy falls below a second threshold and when the deadline aware scheduler was previously enabled. The module may request packets of the video chunk from a video server and select at least one active interface for the video server to send each packet. The deadline aware scheduler may select whether a secondary network interface is to be an active interface or a non-active interface.

20 Claims, 5 Drawing Sheets

(56) References Cited

U.S. PATENT DOCUMENTS

| | | | |
|---|---|---|---|
| 9,503,490 B2 | 11/2016 | Gao et al. | |
| 9,553,913 B2 * | 1/2017 | Yang | H04L 65/80 |
| 9,992,786 B2 * | 6/2018 | Han | H04W 72/1215 |
| 10,034,048 B2 * | 7/2018 | Bichot | H04N 21/44209 |
| 2012/0271880 A1 * | 10/2012 | Sachdeva | H04W 4/60 709/203 |
| 2012/0327779 A1 * | 12/2012 | Gell | H04L 47/2475 370/238 |
| 2013/0095806 A1 * | 4/2013 | Salkintzis | H04L 65/601 455/414.3 |
| 2013/0227102 A1 * | 8/2013 | Beck | H04L 65/4084 709/223 |
| 2013/0279331 A1 * | 10/2013 | Pluntke | H04L 45/24 370/230 |
| 2015/0271700 A1 * | 9/2015 | Lee | H04W 72/1236 370/230 |
| 2015/0282219 A1 * | 10/2015 | Kweon | H04W 76/12 370/235 |
| 2015/0319214 A1 | 11/2015 | Yu et al. | |
| 2015/0381455 A1 * | 12/2015 | Martinsen | H04L 65/608 370/252 |
| 2016/0007295 A1 * | 1/2016 | Kahn | H04W 52/0251 370/311 |
| 2016/0021162 A1 * | 1/2016 | Surcouf | G06F 16/00 709/219 |
| 2016/0050246 A1 | 2/2016 | Liao et al. | |
| 2016/0105728 A1 | 4/2016 | Schmidmer et al. | |
| 2016/0212759 A1 | 7/2016 | Schliwa-Bertling et al. | |
| 2016/0302134 A1 * | 10/2016 | Kim | G06F 15/16 |
| 2016/0323348 A1 | 11/2016 | Bradbury et al. | |
| 2017/0163775 A1 * | 6/2017 | Ravi | H04L 45/24 |
| 2017/0208104 A1 * | 7/2017 | Wei | H04L 29/06 |
| 2017/0346724 A1 * | 11/2017 | Calin | H04L 45/24 |
| 2018/0139146 A1 * | 5/2018 | Friel | H04N 21/60 |
| 2018/0159915 A1 * | 6/2018 | Westphal | H04L 65/607 |

\* cited by examiner

200

```
1:   Input: S – file size and D – deadline;
2:   sentBytes = 0
3:   cellularEnabled = TRUE
4:   timeStart = gettimeofday();
5:   while (sentBytes < S) do
6:       if S – sentBytes > packetSize then
7:           n = packetSize;
8:       else
9:           n = S – sentBytes;
10:      end if
11:      Get n bytes from the file and send using MPTCP;
12:      sentBytes += n;
13:      timeNow = gettimeofday();
14:      timeSpent = timeNow – timeStart;
15:      Get estimated Wi-Fi throughput $R_{WiFi}$;
16:      if ($\alpha \times D$ – timeSpent) $\times R_{WiFi} > \beta \times$ (S – sentBytes) && cellularEnabled ==TRUE then
17:          Disable cellular link (e.g., through setsockopt);
18:      endif
19:      if ($\alpha \times D$ – timeSpent) $\times R_{WiFi} < \gamma \times$ (S – sentBytes) && cellularEnabled ==FALSE then
20:          Enable cellular link (e.g., through setsockopt);
21:      endif
22:  end while
```

FIG. 2

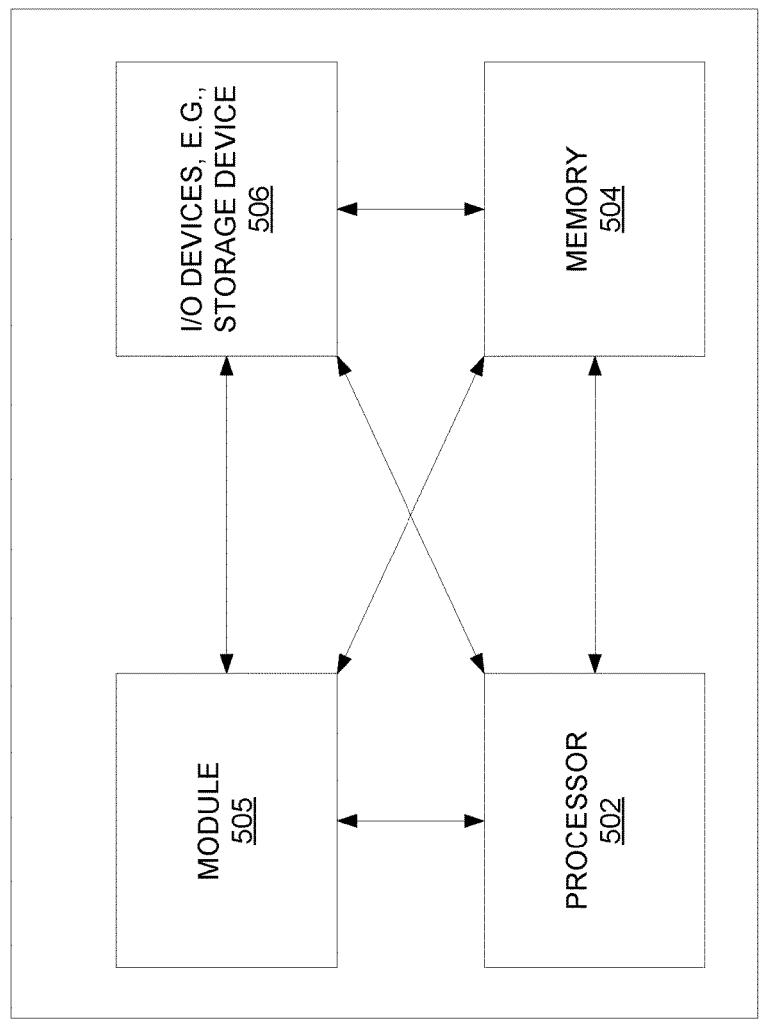

US 10,348,796 B2

ADAPTIVE VIDEO STREAMING OVER PREFERENCE-AWARE MULTIPATH

This invention was made with government support under contract number 1629347 awarded by the National Science Foundation. The government has certain rights in the invention.

The present disclosure relates generally to mobile endpoint device video streaming, and more particularly to devices, computer-readable media and methods for performing operations of a video client, e.g., a Dynamic Adaptive Streaming over Hyper-Text Transfer Protocol (HTTP) (DASH) video client.

BACKGROUND

Video streaming has become one of the most important and popular uses of a mobile device. It is currently estimated that video streaming may account for over 55% of the total mobile traffic, and is forecast to increase to potentially 75% in the future. However, quality of experience (QoE) at mobile endpoint devices for video streaming may be far from satisfactory, especially under challenging network conditions such as unstable wireless connectivity and mobility.

SUMMARY

Devices, computer-readable media, and methods are disclosed for performing operations of a video client. For example, a processor may measure an occupancy of a video buffer, select a first video chunk having a first video encoding bitrate based upon the occupancy of the video buffer, and provide a deadline for a delivery of the first video chunk to a multipath transport layer module. The processor may further activate a deadline aware scheduler of the multipath transport layer module when the occupancy of the video buffer exceeds a first threshold and when the deadline aware scheduler was previously disabled, and deactivate the deadline aware scheduler of the multipath transport layer module when the occupancy of the video buffer falls below a second threshold and when the deadline aware scheduler was previously enabled. In one example, the multipath transport layer module is for requesting a plurality of packets of the first video chunk from a video server and for selecting a network interface from among at least one active interface of a plurality of network interfaces for the video server to send each packet of the plurality of packets of the first video chunk. In addition, in one example, the deadline aware scheduler is for selecting whether a secondary network interface of the plurality of network interfaces is to be an active interface or a non-active interface.

BRIEF DESCRIPTION OF THE DRAWINGS

The teachings of the present disclosure can be readily understood by considering the following detailed description in conjunction with the accompanying drawings, in which:

FIG. 2 illustrates an example algorithm for operations of an example deadline aware scheduler related to the present disclosure;

FIG. 5 illustrates an example high-level block diagram of a computer specifically programmed to perform the steps, functions, blocks, and/or operations described herein.

To facilitate understanding, identical reference numerals have been used, where possible, to designate identical elements that are common to the figures.

DETAILED DESCRIPTION

Figure 1:
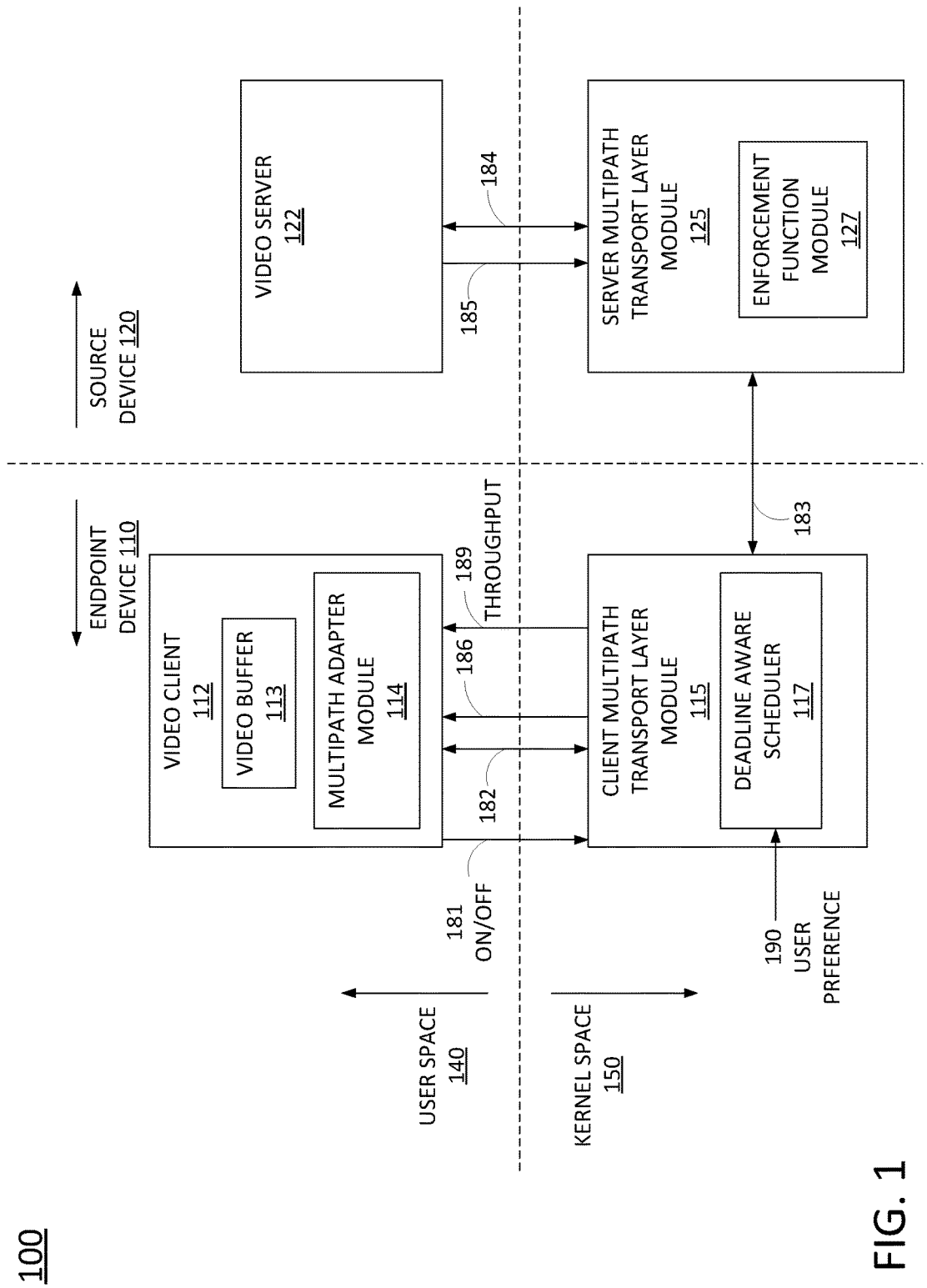
FIG. 1 illustrates an example system related to the present disclosure.

The present disclosure broadly discloses devices, computer-readable media, and methods for performing operations of a video client, e.g., a Dynamic Adaptive Streaming over Hypertext Transfer Protocol (HTTP) (DASH) video client. For instance, in one example, the present disclosure features a DASH video client that operates in conjunction with a multipath transport layer module, e.g., a user preference-aware and deadline-aware multipath transmission control protocol (TCP) (MPTCP) module, at an endpoint device.

Compared with using only a single wireless path such as Wi-Fi, leveraging multipath (e.g., Wi-Fi and cellular) can dramatically improve quality of experience (QoE) for mobile video streaming. For example, cellular usage and radio energy consumption may be significantly reduced, with negligible degradation of QoE, compared with existing MPTCP implementations. In particular, when existing MPTCP implementations are applied to video streaming, it may cause undesired network usage such as substantial over-utilization of metered cellular links. In contrast, examples of the present disclosure feature a multipath framework for adaptive video streaming with user link preference awareness and video chunk delivery deadline awareness. Examples of the present disclosure may also integrate with a wide range of DASH algorithms with MPTCP. DASH (Dynamic Adaptive Streaming over HTTP) is a video streaming standard that forms the basis of a wide range of Internet video protocols, both open and proprietary. In accordance with the present disclosure, in one example, MPTCP support is added to DASH video streaming under user-specified network interface preferences.

In many locations, such as hotels, cafes, airports, etc., open Wi-Fi may fail to provide stable throughput for streaming a high definition video (e.g., 1080 pixel or greater) at its highest quality. In addition, while Long Term Evolution (LTE) cellular links may be sufficient for high definition video at most locations, users may want to limit their cellular data usage. However, it is further noted that the combined bandwidth of Wi-Fi and an available cellular link may typically be able to support the streaming of such a video. Moreover, streaming over multipath is a common feature on various mobile endpoint devices, including laptop computers, smartphones, wearables devices, and so forth. For example, MPTCP allows applications to transparently use multiple paths. It can dramatically improve the QoE of video streaming by providing additional network capacity and robust communications (e.g., facilitating smooth handover). However, standard implementations of MPTCP do not support user network interface preferences, (e.g., preferring Wi-Fi over cellular when at home). As a consequence, when streaming video using MPTCP, undesired cellular network usage may be incurred. For example, MPTCP may prefer the lowest latency path, regardless of the user preference. Thus, if a cellular link has a higher throughput and/or lower latency, a significant portion of packets of the video may be steered to the cellular link, whereas the Wi-Fi bandwidth may be underutilized. This may be the case even in situations where the Wi-Fi link alone may support the highest available encoding bitrate of the video, but where the cellular link still outperforms. Accordingly, users may be hesitant to allow the multipath routing of MPTCP to operate due to concerns of cellular data usage costs and limitations.

For example, if a video that a user desires to stream has a highest available encoding bitrate of 4.0 megabits per second (Mbps) and the bandwidth of the Wi-Fi link is 3.8 Mbps, the user may prefer that 95 percent of the data be routed via the Wi-Fi link for every 5 percent of data that is routed via a cellular link. However, under existing MPTCP implementations, if the cellular link bandwidth is 3.0 Mbps, a much larger percentage of packets of the video may be sent via the cellular link.

To aid in understanding the present disclosure, FIG. 1 illustrates an example system 100 comprising an architecture for DASH video streaming over MPTCP. As illustrated in FIG. 1, the system 100 includes a client, or endpoint device 110 and a server, or source device 120. In one example, the endpoint device 110 and the source device 120 both include a user space 140 and a kernel space 150, respectively. In one example, the user space 140 of endpoint device 110 comprises a video client 112, which may include a multipath adapter module 114. The kernel space 150 of the endpoint device 110 may comprise a client multipath transport layer module 115, e.g., an MPTCP module. In addition, in one example, the multipath transport layer module 115 may include a deadline aware scheduler 117. The deadline aware scheduler 117 may further be user network interface preference-aware. For instance, the client multipath transport layer module 115 and deadline aware scheduler 117 may receive a user preference via a "user preference" input 190 regarding a user's preferred network interface (e.g., a cellular interface, a Wi-Fi interface, etc.). On the source device 120, the user space 140 may include a video server 122, while the kernel space 150 may include a server multipath transport layer module 125, e.g., an MPTCP module, which may include an enforcement function module 127.

In one example, a user may seek to stream a video program from the source device 120 to the endpoint device 110. In one example, the video client 112 receives a request for the video program and submits the request to the video server 122 of source device 120. The request may be forwarded via socket(s) 182, links 183, and socket(s) 184. In one example, the user preference regarding a preferred network interface from the user preference input 190 may also be submitted to the client multipath transport layer module 115 and deadline aware scheduler 117 via the socket 182. In one example, socket(s) 182 and socket(s) 184 may each comprise one or more inter-process communication (IPC) sockets for communication between a user-space application and a kernel space application. In one example, links 183 may be associated with one or more available network interfaces, and may represent available paths through one or more communication networks between the endpoint device 110 and source device 120. In one example, the video client 112 and video server 122 may comprise a DASH client and a DASH server respectively. Accordingly, in one example, the video server 122 may initially provide a manifest file for the video program as a response. The response may be forwarded via socket(s) 184, links 183, and socket(s) 182. The manifest file may identify segments of the video program, different video chunks having different encoding bitrates associated with each segment, the chunk sizes and/or the chunk/segment durations, the location(s) or pointers to the location(s) of such video chunks, e.g., uniform resource locators (URLs), and so forth.

After receiving the manifest file, the video client 112 may select an encoding bitrate for a first segment, and may request a first video chunk corresponding to the first segment and the encoding bitrate that is selected. For example, the request may be forwarded to video server 122 via socket(s) 184, links 183, and socket(s) 182. The video chunk may be provided in response via socket(s) 185, links 183, and socket(s) 186. Socket(s) 185 and 186 may comprise IPC sockets of the same or a similar nature as socket(s) 182 and socket(s) 184 described above. In one example, the video chunk may be stored in video buffer 113 of the video client 112. In addition, the video client 112 may play-out the same video chunk from the buffer 113 and/or select a different a video chunk that is stored in buffer 113 for play-out. The video client 112 may continue to select encoding bitrates for subsequent segments and request corresponding video chunks until the entire video program is downloaded and played, or until the video client 112 is closed.

In a DASH system, a video program is split into multiple segments of the same play time (e.g., 1 to 15 seconds) and each segment is encoded with multiple discrete encoding bitrates into different video chunks. A video player, such as video client 112, can switch between different encoding bitrates at a video chunk boundary, since the video chunks are time-wise aligned. In one example, the video client 112 may comprise a GPAC video player. In general, a DASH video client selects the video chunks' encoding bitrates for achieving an optimal QoE. There are largely two categories of DASH rate adaptation algorithms, throughput-based and buffer-based. A throughput-based rate adaptation algorithm adjusts the encoding bitrate of video chunks based on the estimated throughput (e.g., via all available network interfaces/paths/subflows), which indicates the future network capacity. For example, the FESTIVE algorithm uses harmonic mean of previous chunks' throughputs to estimate the future throughput, which dictates the rate selection. For instance, the video program may measure the download time of the last video chunk, estimate the throughput, and select the highest encoding bitrate lower than the estimated throughput. On the other hand, another example DASH rate adaptation algorithm, Buffer Based Adaptation (BBA), chooses the encoding bitrate based on an occupancy level of a video buffer 113 of the video client 112, which implicitly encodes information of the network capacity when the video playing is at the steady state. The video client 112 may be configured in accordance with any available DASH rate adaptation algorithm, including the abovementioned and others. In addition, as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth.

In one example, the video client 112 selects an encoding bitrate (or selects a video chunk corresponding to a particular encoding bitrate) based upon a combined throughput of one or more available network interfaces between the endpoint device 110 and the source device 120. In one example, the client multipath transport layer module 115 determines and aggregates the individual throughputs of the different network interfaces and provides the overall combined throughput, e.g., via a "throughput" socket 189, for all of the network interfaces to the video client 112. Notably, as described above the video client 112 may perform its own throughput estimation. However, when used in conjunction with the system 100, the throughput estimation may be inaccurate due to the deadline aware scheduler 117 turning a secondary network interface on and off. Thus, in one example, the overall available throughput across a plurality of available network interfaces may be provided by the client multipath transport layer module 115 to the video client 112, and may override any throughput estimate generated at the video client 112.

In one example, to estimate the throughput of a subflow (e.g., a cellular interface or a Wi-Fi interface), the client multipath transport layer module 115 may utilize a non-seasonal Holt-Winters (HW) predictor, which may be more robust than other approaches such as exponentially weighted moving average (EWMA) for non-stationary processes. However, in another example a different throughput estimation technique may be deployed, such as EWMA and others.

In one example, an occupancy of video buffer 113 and an overall throughput of one or more network interfaces are used to determine which encoding bitrate is to be used for a next video chunk, and hence, which video chunk is to be requested. For instance, if the video buffer 113 has a length/size/duration corresponding to 100 video chunks, and there are four encoding bitrates available for segments of the video program, the buffer may be divided into four tiers. The first tier may be 0-25 chunks, the second tier may be 26-50 chunks, the third tier may be 51-75 chunks, and the fourth and highest tier may by 76-100 chunks. In one example, the encoding bitrate may be selected based upon the tier corresponding to a current or recent video buffer occupancy. For instance, in an example with video buffer 113 having four tiers, if the video buffer occupancy is at a level within the fourth tier, a highest available encoding bitrate may be selected. If the video buffer occupancy is at a level within the first tier, a lowest available encoding bitrate may be used. If the video buffer occupancy is at a level within the second or third tier, corresponding intermediate encoding bitrates may be selected. In general, the highest encoding bitrate that can be accommodated with the overall throughput of the available network interfaces is selected for use.

The video client 112 may convey a decision as to which encoding bitrate should be utilized to the client multipath transport layer module 115. In one example, the video client 112 may further convey a deadline and a file size of the video chunk to the client multipath transport layer module 115. For instance, as described in greater detail below, multipath adapter module 114 may selectively activate and deactivate the deadline aware scheduler 117. The calculation of the deadline and possible deadline extensions are also described in greater detail below. Alternatively, or in addition, the video client 112 may request that the client multipath transport layer module 115 obtain a video chunk, e.g., by identifying a URL from which the video chunk may be retrieved from or via the source device 120. For instance, an identification of the video chunk may implicitly identify the encoding bitrate of the video chunk and/or the file size of the video chunk.

In one example, the client multipath transport layer module 115 may make a decision as to which network interface (alternatively, which "path" and/or which "subflow") should be used for the server multipath transport layer module 125 to return packets of the video chunk. In one example, the decision may be made according to an MPTCP scheduling algorithm, e.g., a base MPTCP scheduling algorithm. For instance, a default MPTCP scheduling algorithm may prefer low latency paths, subflows, and/or network interfaces.

When multiple network interfaces have spaces in their congestion windows, a default MPTCP scheduling algorithm may select the network interface with the smallest round trip time (RTT) estimation to transmit the next packet. In another example, a MPTCP deployment may be configured with a round-robin MPTCP scheduling algorithm as an alternative to the default MPTCP scheduling algorithm. In any case, the client multipath transport layer module 115 may convey a scheduling decision in accordance with the base MPTCP scheduling algorithm to the server multipath transport layer module 125, which may then transmit packets of the video chunk via the specified network interface(s).

The base MPTCP scheduling algorithm is invoked at the video chunk level. Accordingly, the video client 112 and/or multipath adapter module 114 may provide the video chunk size and deadline to the client multipath transport layer module 115. In one example, video chunk size is not a mandatory field in a DASH manifest file. However, the video chunk size may be revealed in the "Content-Length" header field of HTTP responses. In another example, DASH manifest files may be upgraded to include video chunk size as a non-optional field. As such, video client 112 may determine a video chunk size and a deadline and convey these parameters to the client multipath transport layer module 115.

In accordance with the present disclosure, deadline aware scheduler 117 may be activated (e.g., by multipath adapter module 114) to function in conjunction with, and in parallel to the base MPTCP scheduling algorithm of the client multipath transport layer module 115. In one example, the deadline aware scheduler 117 is "user preference aware" in addition to being "deadline aware". In this regard, deadline aware scheduler 117 may operate to prefer scheduling of packets via a user-preferred network interface while taking into account a deadline for downloading of a video chunk. In one example, a primary network interface, comprising the user's preferred network interface, is designated as an active network interface, and remains an active network interface.

The deadline aware scheduler 117 then alternatively activates and deactivates one or more secondary network interfaces. For instance, one or more secondary network interfaces may be enabled when it is determined that downloading of packets of a video chunk cannot be completed within the deadline using the primary network interface alone. It should be noted that instead of actually switching on/off the cellular radio or Wi-Fi radio, or adding/removing the cellular subflow or Wi-Fi subflow, a secondary network interface may be skipped in the scheduling function of the client multipath transport layer module 115 when the secondary network interface is "inactive." Thus, no overhead of handshake message exchange is incurred in connection with actively turning radios on and off. This design works as an overlay with both the default and the round-robin MPTCP scheduling algorithms, and others. Note that keeping the cellular radio interface always on incurs small additional energy overhead, e.g., only periodical discontinuous reception (DRX) spikes.

In one example, a base MPTCP algorithm of the client multipath transport layer module 115 continues to operate without modification. For example, when only the primary network interface is an active network interface, the base MPTCP algorithm may schedule packets on the primary network interface (since there are no other options). However, when the primary network interface and a secondary network interface are both active, the base MPTCP algorithm select routings for packets over both network interfaces in the same manner as if the deadline aware scheduler 117 was not deployed.

As illustrated in FIG. 1, in one example the deadline aware scheduler 117 is paired with an enforcement function module 127 of the server multipath transport layer module 125 on the source device 120. In one example, the deadline aware scheduler 117 determines how to manage the paths (e.g., whether the cellular subflow/cellular network interface should be enabled) based on the information from the multipath adapter module 114. In one example, the deadline aware scheduler 117 notifies the enforcement function module 127 of the decision using a reserved bit in an MPTCP option message. In particular, the source device 120 does not run the video client 112, e.g., with DASH video logic, thus the multipath adapter module 114 and the corresponding deadline aware scheduler 117 are deployed on the client side, e.g., endpoint device 110. In addition, the architecture of the system 100 of FIG. 1 is scalable insofar as the server side, e.g., source device 120, becomes stateless.

In one example, the deadline aware scheduler 117 offers a socket option to convey the data size S and the deadline D from the user space 140 to the kernel space 150. For instance, the socket option may be indicated by the "on/off" socket 181 illustrated in FIG. 1. Upon the reception of the data size and the deadline, the deadline aware scheduler 117 may be activated for the next S bytes of data. The deadline aware scheduler 117 may be deactivated when any of the following happens: (1) S bytes have been successfully transferred, (2) the deadline has passed, or (3) the multipath adapter module 114 and/or video client 112 explicitly deactivates the deadline aware scheduler 117 using a disable socket option, e.g., the "on/off" socket 181 illustrated in FIG. 1.

In one example, the deadline aware scheduler 117 may operate in accordance with the algorithm 200 of FIG. 2. For instance, a processor of the video client 112 may execute code to perform operations of client multipath transport layer module 115, where the code may include code corresponding to the algorithm 200. The operations of an example deadline aware scheduler are further described in co-pending U.S. patent application Ser. No. 15/086,613, filed on Mar. 31, 2016 by Han, et al. and titled "FACILITATION OF MULTIPATH SCHEDULING," which is incorporated by reference herein in its entirety.

In the method, code, or algorithm 200 of FIG. 2, a Wi-Fi interface is a preferred network interface and a cellular link/cellular interface is a secondary network interface. However, in other examples, a cellular interface, or another type of network interface may be a preferred network interface, while a Wi-Fi interface may be a secondary interface. In line 1 of the algorithm 200, the file size (e.g., the video chunk size) and the deadline may be received as inputs. Referring to the example of FIG. 1, the video chunk size (S) and deadline (D) for algorithm 200 may be provided by multipath adapter module 114 to the deadline aware scheduler 117 of the client multipath transport layer module 115, which may include the algorithm 200.

Notably, the algorithm 200 can leverage the existing MPTCP schedulers to distribute packets over multiple network interfaces and add the intelligence of controlling the cellular subflow (e.g., the flow of packets over the cellular interface). Referring to line 1, the algorithm 200 takes two input parameters, the file size S (e.g., the video chunk size) and the deadline D (e.g., the size of download time window from when download starts until the deadline). The "while" loop is responsible for sending packets from the file using MPTCP (line 11). In one example, $R_{WiFi}$ in line 15 may comprise a current estimation of the Wi-Fi throughput. In another example, $R_{WiFi}$ may comprise a moving average of the throughput within a most recent time window. After sending out the decision for each packet, the code of algorithm 200 may cause a device executing the algorithm 200, e.g., endpoint device 110 via the deadline aware scheduler 117, to verify if the Wi-Fi interface alone is sufficient to transmit the remaining packets. If the bandwidth and/or throughput of the Wi-Fi interface is sufficient, then the cellular interface, or "cellular link" may be disabled (lines 16-18).

To compensate for estimation inaccuracy of Wi-Fi throughput, the target finish time can be ahead of a real deadline by setting α in lines 16 and 19 to be less than 1. The smaller the value of α, the less likely the actual deadline will be missed. However, a smaller α can also lead to more data over the cellular link. Since the Wi-Fi throughput can change over time, after the cellular link is disabled in accordance with line 17, the device executing the algorithm 200 may also check if the cellular link should be enabled again, in case the Wi-Fi throughput drops (e.g., in accordance with lines 19-21). Parameters β≥1 and γ≤1 may be used to avoid unnecessary oscillation between disabling and enabling the cellular link.

Performance of the algorithm 200 may depend on the estimation of Wi-Fi throughput. In one example, to improve the robustness of the algorithm 200 and to compensate for any inaccuracies of throughput estimation, a conservation margin can be added to the estimated throughput. For example, using P % (P≤100) of the actual measured throughput as $R_{WiFi}$. Alternatively, or in addition, the throughput of the cellular path/cellular interface, $R_{cellular}$, may be used to enable the cellular link without any conditions near the end of the deadline, e.g., in accordance with Equation 1 below, where $T_{ramp}$ is the time needed for a cellular link and its TCP subflow to reach full capacity. However, while the use of such a technique can avoid the missing of a deadline, it may increase cellular data usage.

$$\alpha \times D - T_{ramp} - (S-\text{sentBytes})/(R_{WiFi} + R_{Cellular}) \quad \text{Equation 1:}$$

Referring again to FIG. 1, the deadline aware scheduler 117 may take as inputs the user's network interface preference, as well as a video chunks' size and delivery deadline from the multipath adapter module 114 of the video client 112. The deadline aware scheduler 117 then intelligently activates and deactivates a secondary network interface (or multiple secondary network interfaces) to ensure that the entire video chunk is received at the endpoint device 110 within the deadline.

As mentioned above, the multipath adapter module 114 may provide the video chunk size and deadline to the deadline aware scheduler 117, e.g., in conjunction with an activation of the deadline aware scheduler 117. In one example, the deadline D for delivery of a video chunk is set such that an occupancy level of video buffer 113 does not fall. In one example, a duration-based approach is employed where the deadline D is set to a video chunk's play-out duration. For example, the deadline of a 4-second video chunk is 4 seconds, regardless of the encoding bitrate. In another example, a rate-based approach is employed where the deadline D for a video chunk is set to the video chunk size divided by the nominal (i.e., average) encoding bitrate. For example, for a 1 MB chunk with an average encoding bitrate of 4 Mbps, D is set to 1*8/4=2 seconds. The duration-based scheme aims to maintain the video buffer occupancy level in the short term: a video client 112 may consume D-seconds of video from the video buffer 113, while a D-second video chunk is downloaded and supplied to the video buffer 113 within the same D seconds, thus leading to a stable (or increasing) video buffer occupancy level. In contrast, the rate-based scheme aims to maintain the video buffer occupancy level in the long run: the average encoding bitrate over the entire video program is considered. In one example, the deadline D may comprise an input to the algorithm 200 of FIG. 2, e.g., executed by the deadline aware scheduler 117 of the endpoint device 110.

Examples of the present disclosure may also extend a deadline D for delivery of a video chunk in some circumstances. For instance, it is unlikely for a video stall to happen when the video buffer occupancy is close to full. In this "safe region", the deadline may be relaxed (i.e., extend) and more opportunity given to the deadline aware scheduler 117 to leave the secondary network interface deactivated. To illustrate, assume the video buffer occupancy threshold for enabling deadline extension is $\phi$ and the current buffer occupancy level is b>$\phi$ (both b and $\phi$ have the unit of seconds). In one example, the deadline may then be extended by b−$\phi$. The threshold $\phi$ incurs a tradeoff between the secondary network interface usage (e.g., cellular usage) and playback robustness. When the video buffer occupancy level is high, the deadline may be extended. However, when the video buffer occupancy level is low, the deadline aware scheduler 117 may be disabled (or may be left inactive). For example, the video buffer occupancy level may be low during the initial buffering phase or when a path and/or network interface temporarily fails, has severe congestion, etc. Thus, in one example, the deadline aware scheduler 117 may be disabled when the video buffer occupancy level is lower than a threshold $\Omega$. The setting of $\Omega$ may depend on the type of DASH rate adaptation algorithm that is deployed within the video client 112.

In one example, the deadline extension threshold $\phi$, when used in connection with a throughput-based rate adaptation, may empirically be set to 80% of the overall capacity of video buffer 113. However, it should be noted that other thresholds may be utilized in accordance with the present disclosure, e.g., a video buffer occupancy level of 65% of the overall capacity of video buffer 113, 75% of the overall video buffer capacity, 85% of the overall video buffer capacity, and so forth. In one example, the low-buffer threshold $\Omega$ for disabling the deadline aware scheduler 117 is set to be equal to T−T', where T and T' are the buffering time to be consumed and supplied, respectively. For a time window of the next T seconds assuming the lowest available encoding bitrate is currently be utilized, the length (in time) of video chunks that can be downloaded during this window is estimated to be T'. Notably, the implementation of a low buffer threshold aims to prevent video stalls associated with positive values of $\Omega$. Note that a negative $\Omega$ may be treated as zero (0). In one example, T is set to be twice of the duration of the entire video buffer 113. In addition, in one example, the minimum value of $\Omega$ may be set to 40% of the overall video buffer capacity, or other floor value, such as 35%, 45%, etc.

The thresholds for deadline extension and for disabling deadline aware scheduler 117 in connection with buffer-based rate adaptation may be set as follows. In one example, $\phi$ (the high-buffer threshold for deadline extension) is conservatively set to be the overall video buffer capacity minus one video chunk's duration. However, in other examples, a different threshold may be used, such as the overall video buffer capacity minus the durations of two video chunks, the overall video buffer capacity minus the durations of four video chunks, etc. For $\Omega$ (the low buffer threshold), a single buffer occupancy threshold is not used, e.g., as in the throughput-based scheme. In a buffer-based scheme, each encoding bitrate has its own buffer occupancy range. Accordingly, in one example, the deadline aware scheduler 117 is activated when the video client 112 reaches the highest encoding bitrate that the network can sustain (e.g., across all available network interfaces). At this point, the multipath adapter module 114 aims to keep the video buffer occupancy level higher than the lowest level of the current encoding bitrate tier (otherwise in accordance with DASH buffer-based rate adaptation the encoding bitrate that is selected for the next video chunk will drop to match the next tier down. Therefore, in one example, the multipath adapter module 114 may disable the deadline aware scheduler 117 whenever the video buffer occupancy is close to the lowest level of the current encoding bitrate tier, $e_{low}$. In one example, $\Omega$ is empirically set to be $e_{low}$ plus the duration of one video chunk. For example, assume the current video encoding bitrate maps to a video buffer occupancy range/tier from $e_{low}$=20 to $e_{high}$=40 seconds, and a duration of a video chunk is 4 seconds. In such an example, the deadline aware scheduler 117 is active if and when the video buffer 113 contains at least 24 seconds' worth of video chunks. Otherwise, the deadline aware scheduler 117 is disabled.

It should be noted that the architecture of the system 100 of FIG. 1 is provided for illustrative purposes, and that other, further, and different examples may take a different form. For instance, as illustrated in FIG. 1, the deadline aware scheduler 117 is implemented in kernel space (e.g., within the context of a Linux platform). Thus, the deadline aware scheduler 117 is tightly coupled with the base scheduling algorithm (e.g., MPTCP) of the client transport layer module 115. However, in another example, the deadline aware scheduler 117 may be deployed within user space 140 of the endpoint device 110. In another example, a different DASH rate adaptation algorithm may be implemented by video client 112. For instance, a hybrid DASH rate adaptation algorithm, such as Model Predictive Control (MPC), may be deployed which uses a pre-generated table to perform a lookup and select an optimal encoding bitrate based upon the video buffer occupancy level, the encoding bitrate of a previous video chunk, and a throughput estimation. To support multipath scheduling of the client multipath transport layer module 115 and the deadline aware scheduler 117, the multipath adapter module 114 may set a deadline for a video chunk as the video chunk size divided by the minimum throughput associated with the optimal bitrate known from the table. Thus, these and other modifications are all contemplated within the scope of the present disclosure.

Figure 3:
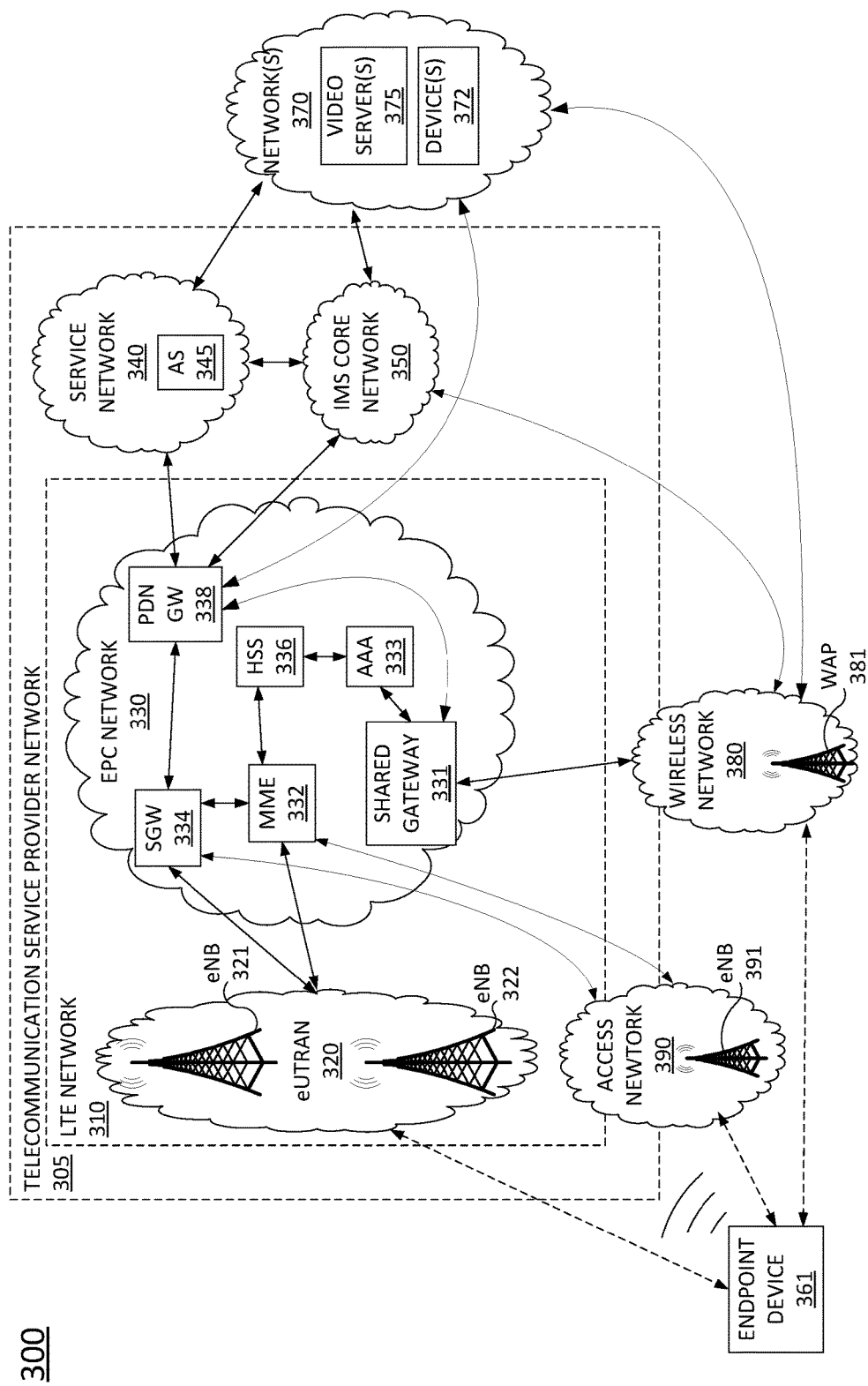
FIG. 3 illustrates an additional example system related to the present disclosure.

To aid in understand the present disclosure, FIG. 3 illustrates an example network, or system 300 that may implement embodiments of the present disclosure for performing operations of a video client. In one example, the system 100 includes a telecommunication service provider network 305. The telecommunication service provider network 305 may comprise a Long Term Evolution (LTE) network 310, a service network 340, and a core network, e.g., an IP Multimedia Subsystem (IMS) core network 350. The system 300 may further include other networks 370 connected to the telecommunication service provider network 305. As shown in FIG. 3, the system 300 may connect endpoint device 361 with with application server (AS) 345 in service network 340, with video servers 375 in networks 370, and/or with other components of telecommunication service provider network 305. The endpoint device 361 may comprise a cellular telephone, a smartphone, a tablet computing device, a laptop comwputer, a pair of computing glasses, a wireless enabled wristwatch, or any other wireless and/or cellular-capable mobile telephony and computing device (broadly, a "mobile endpoint device"). In one example, the endpoint device 361 may comprise a device of a subscriber or customer of the telecommunication service provider network 305.

Figure 4:
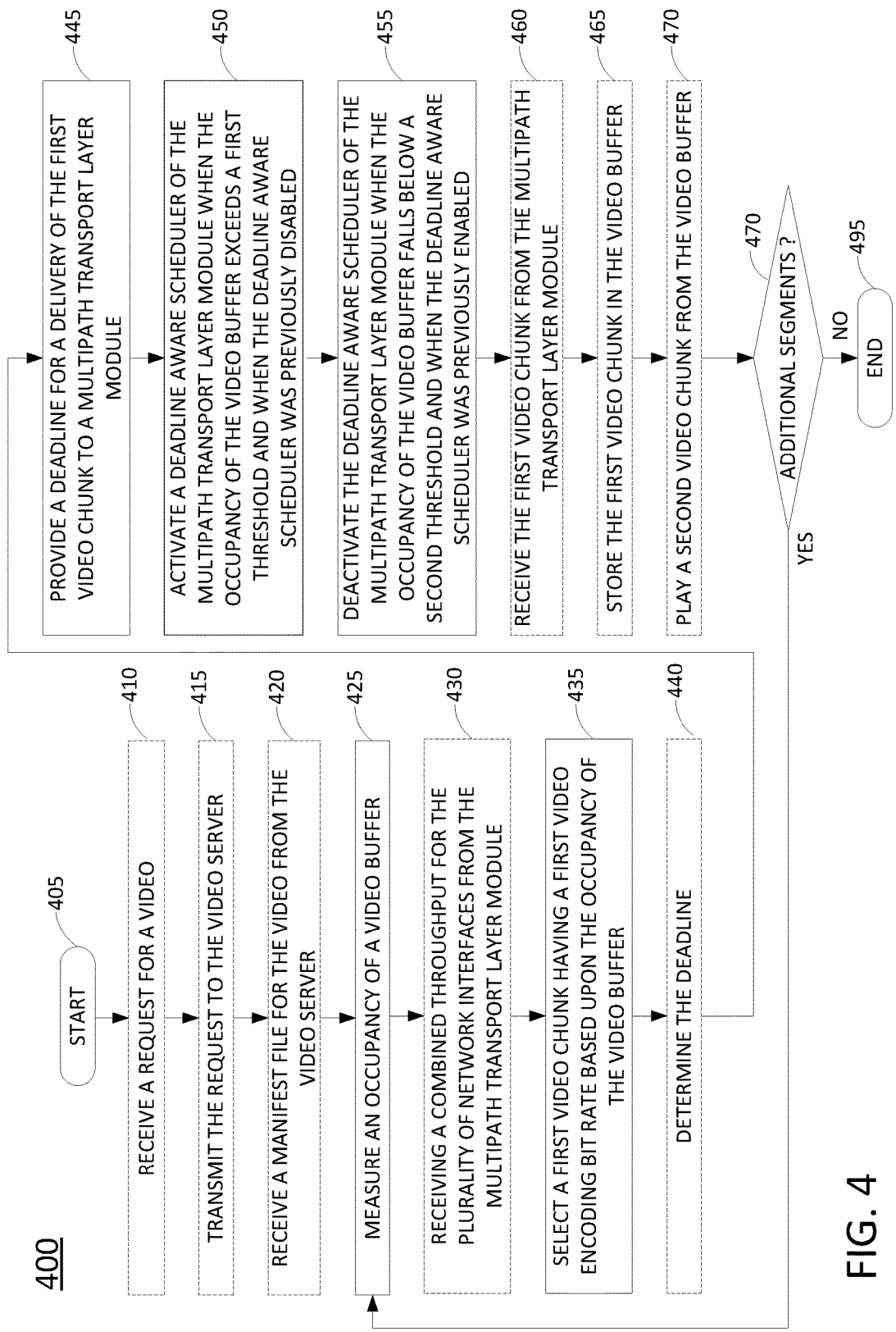
FIG. 4 illustrates a flowchart of an example method for performing operations of a video client.

In accordance with the present disclosure, endpoint device 361 may comprise an endpoint device as illustrated in FIG. 1 and described above, e.g., endpoint device 110. For instance, endpoint device 361 may include a video client, e.g., a DASH video client having a multipath adapter module, and a client multipath transport layer module, e.g., a MPTCP client module having a deadline aware scheduler. In one example, endpoint device 361 may comprise a computing system, such as computing system 500 depicted in FIG. 5, specifically configured to perform operations of a video client, in accordance with the present disclosure. For instance, endpoint device 361 may be configured to perform the operations of the method 400 as illustrated in FIG. 4 and described in greater detail below, and/or to perform other operations.

In one example, the LTE network 310 comprises an access network and a core network. For example, as illustrated in FIG. 3, LTE network 310 may comprise an evolved Universal Terrestrial Radio Access Network (eUTRAN) 320 and an evolved packet core (EPC) network 330. The eUTRANs are the air interfaces of the $3^{rd}$ Generation Partnership Project (3GPP) LTE specifications for mobile networks. In one example, EPC network 330 provides various functions that support wireless services in the LTE environment. In one example, EPC network 330 is an Internet Protocol (IP) packet core network that supports both real-time and non-real-time service delivery across a LTE network, e.g., as specified by the 3GPP standards. In one example, all eNodeBs, e.g., including eNodeB (eNB) 321 and eNodeB (eNB) 322 in the eUTRAN 120, are in communication with the EPC network 330. In operation, LTE user equipment or user endpoints (UE), such as endpoint device 361, may access wireless services via the eNodeBs 321 and 322 located in eUTRAN 320. It should be noted that any number of eNodeBs can be deployed in an eUTRAN.

In EPC network 330, network devices Mobility Management Entity (MME) 332 and Serving Gateway (SGW) 334 support various functions as part of the LTE network 310. For example, MME 332 is the control node for the LTE access networks, e.g., including eUTRAN 320. In one embodiment, MME 332 is responsible for user equipment tracking and paging (e.g., such as retransmissions), bearer activation and deactivation process, selection of the SGW, e.g., SGW 334, and user authentication. In one embodiment, SGW 334 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 330 may comprise a Home Subscriber Server (HSS) 336 that contains subscription-related information (e.g., subscriber profiles), registration data, and network policy rules, and that performs authentication and authorization of a wireless service user. Thus, HSS 336 may store information regarding various subscriber/customer devices, such as endpoint device 361. HSS 336 may also maintain and provide information about subscribers' locations. In one example, Authentication, Authorization, and/or Accounting (AAA) server 333 obtains subscriber profile information form HSS 336 to authenticate and authorize endpoint devices to connect to EPC network 330 via Institute for Electrical and Electronics Engineers (IEEE) 802.11 (Wi-Fi)/non-3GPP access networks. The EPC network 330 may also comprise a packet data network (PDN) gateway 338 which serves as a gateway that provides access between the EPC network 330 and various data networks, e.g., service network 340, IMS core network 350, networks 370, and the like. The packet data network gateway 338 is also referred to as a PDN gateway, a PDN GW or a PGW. In one example, system 300 may also include an application server (AS) 335.

In one example, service network 340 may comprise one or more devices, such as application server (AS) 345 for providing services to subscribers, customers, and or users. For example, telecommunication service provider network 305 may provide a cloud storage service, web server hosting, and other services. As such, service network 340 may represent aspects of telecommunication service provider network 305 where infrastructure for supporting such services may be deployed. In one example, AS 345 may comprise a computing system, such as computing system 500 depicted in FIG. 5, specifically configured to perform operations of a video server, e.g., a Dynamic Adaptive Streaming over Hypertext Transfer Protocol (HTTP) (DASH) video server, in accordance with the present disclosure. For instance, AS 345 may comprise a source device such as source device 120 illustrated in FIG. 1 and described above. Although a single application server, AS 345, is illustrated in service network 340, it should be understood that service network 340 may include any number of components to support one or more services that may be provided to one or more subscribers, customers, or users by the telecommunication service provider network 305. Thus, in another example AS 345 may represent multiple devices which collectively function as a video server. For instance, a large library of video programs may be stored on a cluster of devices, where different video programs may be stored on different physical devices and/or where portions of one or more video programs, e.g., video chunks may be split across different physical devices.

In one example, networks 370 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 370 may include different types of networks. In another example, the other networks 370 may be the same type of network. In one example, the other networks 370 may represent the Internet in general. Devices 372 may include servers, such as web servers, storage devices, enterprise servers, email servers, and so forth. Devices 372 may also include personal computers, desktop computers, laptop computers, personal digital assistants (PDAs), tablet computing devices, or any other devices for wireless and/or wired communications. In one example, endpoint device 361 may communicate with devices 375 in networks 370 via PDN GW 338 and/or via PDN GW 338 and IMS core network 350, e.g., for voice over LTE (VoLTE)-based calls or Wi-Fi calling.

In accordance with the present disclosure, networks 370 may also include one or more video servers 375. In one example, video servers 375 may each comprise a device, such as computing system 500 depicted in FIG. 5, specifically configured to perform operations of a video server, e.g., a DASH video server, in accordance with the present disclosure. For instance, video servers 375 may each comprise a source device such as source device 120 illustrated in FIG. 1 and described above. In one example, video servers 375 may be configured in the same or a similar manner as described above in connection with AS 345.

In one example, system 300 may also include an access network 390 with an eNodeB (eNB) 391. The eNodeB 391 may comprise, for example, a home eNodeB (HeNB), a "small cell," such as a femtocell, a microcell, etc., and/or a "low power" eNodeB. For instance, eNB 391 may have a range of 2 kilometers or less, while eNodeBs 321 and 322 may have a range of up to 35 kilometers or more. In one example, access network 390 and eNB 391 may connect to EPC network 330 via a subscriber/customer broadband connection. For instance, access network 390 may comprise a home network of a customer/subscriber and eNodeB 391 may connect via a home gateway (not shown) or similar equipment deployed at the customer premises to SGW 334 and MME 332 in EPC network 330, e.g., via S1 interfaces. While access network 390 may comprise a home network, eNodeB 391 may continue to be managed by telecommunication service provider network 305 or may be managed by a customer/subscriber associated with access network 390. In another example, both access network 390 and eNodeB 391 may be controlled and/or managed by telecommunication service provider network 305. In other words, access network 390 and eNodeB 391 may be part of telecommunication service provider network 305 and/or LTE network 310. For instance, an operator of telecommunication service provider network 305 may add access network 390 and eNodeB 315 as a small cell, picocell, femtocell, or the like to fill gaps in coverage of macro-cells or to temporarily support larger numbers of endpoint devices in an area, e.g., at a concert, sporting event, or other large gathering. In still another example, access network 390 may comprise a portion of a peer network, e.g., of a different telecommunication service provider.

In one example, EPC network 330 may also include a shared gateway 331. In one example, shared gateway 331 may comprise an evolved packet data gateway (ePDG), a trusted wireless local area network (WLAN) authentication, authorization, and accounting (AAA) proxy (TWAP), and a trusted WLAN access gateway (TWAG). In other words, shared gateway 331 may comprise a device that is configured to provide functions of all of an ePGD, a TWAP and a TWAG. In one example, ePDG functionality of the shared gateway 331 may process traffic from endpoint devices accessing the EPC network 330 via untrusted wireless networks (e.g., IEEE 802.11/Wi-Fi networks), while TWAP/TWAG functionality of shared gateway 341 may process traffic from endpoint devices accessing the EPC network via trusted wireless networks (e.g., IEEE 802.11/W-Fi networks). Wireless networks and WAPs may be designated as "trusted" or "untrusted" based upon several factors, such as whether the wireless network is a customer or subscriber network, or a peer network, e.g., of a different telecommunication service provider, based upon a model or type of WAP, and so forth. In addition, as referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through the system 300.

In accordance with the present disclosure, a number of network interfaces may be available to endpoint device 361 to communicate with AS 345 and/or video servers 375, e.g., to obtain DASH video programs. For instance, a first network interface may be available via eUTRAN 320 and eNodeBs 321 and 322, e.g., a "cellular interface." A second network interface may be available via wireless network 380 and WAP 381, e.g., a "Wi-Fi interface." In addition, a third network interface may be available via access network 390 and eNodeB 391, e.g., a second "cellular interface." Although not illustrated in FIG. 3, other network interfaces may be available, such as additional W-Fi interfaces, a wired interface, e.g., via a wired Ethernet local area network (LAN), a satellite downlink (and/or a satellite link with both uplink and downlink support), and so forth. As such, in one example, endpoint device 361 may provide a user interface to enable a user of endpoint device 361 to select a preferred network interface as a primary interface for video multipath scheduling. In one example, the user interface may further enable the user of endpoint device 361 to select one or more additional interfaces as secondary interfaces (and alternatively, to designate certain interfaces as being unavailable for video multipath scheduling). In one example, the endpoint device 361 may open one or more transmission control protocol (TCP) sessions (or other transport layer sessions, such as uniform datagram protocol (UDP) sessions) for each of the available network interfaces.

In this regard, it should be noted that as referred to herein, when a network interface is enabled or disable, this may similarly refer to enabling or disabling a "sub-flow," e.g., a TCP flow for one of the network interfaces. As further used herein, the term "path" may also be used to describe a route through a network associated with the transport of packets in connection with a "sub-flow" associated with a network interface. Endpoint device 361 may therefore utilize any one or more of the network interfaces to request a video program, e.g., from AS 345 and/or one or more of video servers 375, to receive a manifest file, to request video chunks of the video program in accordance with a DASH rate adaptation algorithm and/or a multipath scheduling algorithm, and so forth.

It should be noted that the system 300 has been simplified. In other words, the system 300 may be implemented in a different form than that which is illustrated in FIG. 3. For example, the system 300 may be expanded to include additional networks, such as network operations center (NOC) networks, additional eUTRANs, and so forth. The system 300 may also be expanded to include additional network elements such as border elements, routers, switches, policy servers, security devices, gateways, a content distribution network (CDN) and the like, without altering the scope of the present disclosure. In addition, system 300 may be altered to omit various elements, substitute elements for devices that perform the same or similar functions, combine elements that are illustrated as separate devices, and/or implement network elements as functions that are spread across several devices that operate collectively as the respective network elements. For example, shared gateway 331 and SGW 334 may be combined into a single component, AAA 333 and HSS 336 may be combined into a single component, and so forth. In addition, various elements of eUTRAN 320, EPC network 330, and IMS core network 350 may be omitted for clarity, including gateways or border elements providing connectivity between such networks, and between the network elements therein.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, and the like, or a future technology or standard-based network). Similarly, although the shared gateway 331, HSS 336, and AAA server 333 are illustrated as components within EPC network 330 having a particular configuration, in other examples, any one or more of these components may be deployed in a different configuration. For example, HSS 336 and/or AAA server 333 may be deployed in IMS core network 350, while other components may reside external to EPC network 330 within LTE network 310, and so on. Thus, these and other modifications are all contemplated within the scope of the present disclosure.

FIG. 4 illustrates a flowchart of an example method 400 for performing operations of a video client, in accordance with the present disclosure. In one example, steps, functions and/or operations of the method 400 may be performed by an endpoint device. For example, the method 400 may be performed by endpoint device 110 in FIG. 1, or endpoint device 110 in conjunction with a video server, such as source device 120. Similarly, the method 400 may be performed by endpoint device 361 in FIG. 3, or endpoint device 361 in conjunction with other components of the system 300, such as 145 or one or more of video servers 175. In one example, the steps, functions, or operations of method 400 may be performed by a computing device or system 500, and/or processor 502 as described in connection with FIG. 5 below. For example, the system 500 may represent an endpoint device, in accordance with the present disclosure. For illustrative purposes, the method 400 is described in greater detail below in connection with an example performed by a processor, such as processor 402. The method begins in step 405 and may proceed to optional step 410 or to step 425.

At optional step 410, the processor may receive a request for a video. In one example, the request may be received via an application interface or a web browser interface which displays on a screen of an endpoint device a number of available video programs which may be streamed from one or more network-based servers. The request may be received via a user input such as a keyboard, keypad or touch screen entry, e.g., by a user typing a name or URL of a video program, by using arrow keys or the like to move through an on-screen list of video programs to select a video program, by a user moving an on-screen pointer via a mousepad, trackpad, or the like to select a particular video program displayed in the screen, and so forth.

At optional step 415, the processor may transmit the request to the video server. For instance, the processor may send the request via a multipath transport layer module of the endpoint device, e.g., a client multipath transport layer module, over a network interface, e.g., a primary network interface, to the video server. In one example, the client multipath transport layer module may comprise a MPTCP client. The request may be received on the video server via a corresponding server multiport transport layer module, e.g., operating in a kernel space on the video server side. In one example, the primary network interface may be selected via a user input and may be selected from among a plurality of available network interfaces, such as a cellular interface, or a non-cellular interface, such as a Wi-Fi interface, a wired interface, a satellite downlink, etc.

At optional step 420, the processor may receive a manifest file for the video from the video server. In one example, the request may be received via the (client) multipath transport layer module. The manifest file may identify a plurality of chunks of the video. The plurality of chunks of the video may include chunks associated with a same segment of the video but having different encoding bitrates. In other words, the video that is requested may comprise a DASH video.

At step 425, the processor measures an occupancy of a video buffer. For instance, the processor may maintain a video buffer, e.g., in a user space portion of a memory, for storing video chunks or other units, such as packets or other protocol data units (PDUs) for storing and playing out portions of the video streamed from the video server. In one example, the video buffer may be configured in the same or in a similar manner as described above in connection with the video buffer 113 of the system 100. Following step 425, the method 400 may proceed to step 435 or to optional step 430.

At optional step 430, the processor may receive a combined throughput for the plurality of network interfaces from the (client) multipath transport layer module. In one example, the combined throughput may be measured via the (client) multipath transport layer module. In this regard, it should be noted that in one example, the processor may also measure throughputs of different network interfaces and calculate the combined throughput. In other words, the processor may perform operations in accordance with a client multipath transport layer module allocated to a kernel space of the endpoint device, and may also perform operations of a video client of the endpoint device, e.g., a user space application, according to the steps of the method 400. In one example, the video client may comprise a Dynamic Adaptive Streaming over Hypertext Transfer Protocol (HTTP) (DASH) video client.

At step 435, the processor selects a first video chunk having a first video encoding bitrate based upon the occupancy of the video buffer. In one example, the selection of the first video chunk having the first video encoding bitrate is further based upon the combined throughput that may be received at optional step 430. For instance, in one example, the video may comprise a DASH video that is divided into a plurality of segments (e.g., equally spaced/timed segments of 1-15 seconds, or the like). In addition, in one example, for each segment, a plurality of different video chunks may be made available, e.g., a first video chunk having a first encoding bitrate, a second video chunk having a second encoding bitrate, and so on. For instance, in one example, four different video chunks associated with the same segment may be provided, each having a different encoding bitrate. In one example, the processor may select the first video chunk from among a plurality of video chunks associated with a segment using a throughput-based or a buffer based rate adaptation algorithm, both of which are described in greater detail above, or in accordance with a different rate adaptation algorithm. Following step 435, the method 400 may proceed to step 445 or to optional step 440.

At optional step 440, the processor may determine a deadline for completion of a downloading/delivery of the first video chunk. In one example, the determining the deadline comprises setting the deadline to a first time value corresponding to a duration of the first video chunk, or corresponding to a size of the first video chunk divided by an (average) video encoding bitrate of the first video chunk. In one example, the processor may extend the deadline beyond the first time value to a second time value, e.g., when the occupancy of the video buffer exceeds a third threshold that is greater than the first threshold. For instance, the deadline may be extended as described above when the video buffer occupancy is high and there is little risk of a video playback stall that may occur if the video buffer were depleted. In one example, the third threshold may comprise a video buffer occupancy threshold for enabling deadline extension, $\phi$, as described above.

At step 445, the processor provides a deadline for a delivery of the first video chunk to a multipath transport layer module, e.g., a client multipath transport layer module of the endpoint device. In one example, the deadline may be determined accordance with optional step 440. In one example, the multipath transport layer module is for requesting a plurality of packets of the first video chunk from a video server and for selecting a network interface from among at least one active interface of a plurality of network interfaces for the video server to send each packet of the plurality of packets of the first video chunk. In one example, the multipath transport layer module implements a base scheduling algorithm (e.g., a "default" MPTCP scheduling algorithm, a round-robin MPTCP scheduling algorithm, or the like) at the video chunk level. For instance, a default MPTCP scheduling algorithm may prefer low latency paths, subflows, and/or network interfaces. When multiple network interfaces have spaces in their congestion windows, a default MPTCP scheduling algorithm may select the network interface with the smallest round trip time (RTT) estimation to transmit the next packet. However, it should be noted that where a single network interface is active, the multipath transport layer module may simply select the active network interface in accordance with the base scheduling algorithm.

At step 450, the processor activates a deadline aware scheduler of the (client) multipath transport layer module when the occupancy of the video buffer exceeds a first threshold and when the deadline aware scheduler was previously disabled. For instance, the deadline aware scheduler is for selecting whether a secondary network interface of the plurality of network interfaces is to be an active interface or a non-active interface. Alternatively, or in addition, the deadline aware scheduler is further for selecting whether multiple secondary network interfaces of the plurality of network interfaces are to be active interfaces or non-active interfaces. In this regard, it should be noted that the method 400 is described primarily in connection with an example where a (single) secondary network interface is activated and deactivated. However, it should be appreciated that the description of the method 400 is equally applicable to examples where the availability of a plurality of secondary network interfaces is controlled by the deadline aware scheduler.

As mentioned above, a primarily network interface may be designated by a user and may comprise a Wi-Fi interface, a cellular interface, a wired interface, a satellite downlink, etc. In one example, the processor maintains the primary network interface as an active interface. In one example, the secondary network interface may comprise a different network interface of a plurality of available network interfaces which may include cellular interface(s), or non-cellular interfaces, such as Wi-Fi interface(s), wired interface(s), satellite downlink(s), and so forth. As described above, in one example, the secondary network interface is maintained as an active interface at least until a buffer occupancy exceeds a first threshold. For instance, having at least two active network interfaces may enable the (client) multipath transport layer module to more quickly obtain packets and/or video chunks of the video to fill the video buffer. In one example, the first threshold may comprise a buffer occupancy associated with a highest video encoding bitrate that is sustainable in accordance with the combined throughput of the plurality of available network interfaces and/or a corresponding tier of the video buffer, or an overall capacity of the video buffer minus a video chunk duration associated with the first video chunk (wherein the video chunk duration is also associated with the segment, and the other video chunks and corresponding segments of the video).

However, once the video buffer is sufficiently filled, the processor may activate the deadline aware scheduler. The deadline aware scheduler may then selectively activate and deactivate the secondary network interface (or multiple secondary network interfaces), e.g., according to the algorithm 200 of FIG. 2, or according to a set of similar operations. In particular, when the primary interface throughput is sufficient to receive video chunks at a rate at least as fast as the play-out of video chunks stored in the video buffer, the video buffer occupancy level may be maintained without the use of one or more secondary network interfaces. In one example, the deadline aware scheduler may determine whether the throughput of primary interface is sufficient based upon the deadline and the video chunk size and/or based upon the duration, the average video encoding bitrate and the video chunk duration. When the deadline aware scheduler determines that the primary interface throughput is not sufficient to receive video chunks at a rate that will maintain the video buffer occupancy level, e.g., when the deadline will not be met, the deadline aware scheduler may then activate the secondary network interface (and/or one or more additional secondary network interfaces). However, when the deadline aware scheduler determines that the primary interface throughput is sufficient to receive video chunks at a rate that will maintain the video buffer occupancy level, e.g., when the deadline will be met, the deadline aware scheduler may deactivate the secondary network interface (and/or one or more additional secondary network interfaces) or may maintain the one or more secondary network interfaces as inactive.

At step 455, the processor deactivates the deadline aware scheduler of the multipath transport layer module when the occupancy of the video buffer falls below a second threshold and when the deadline aware scheduler was previously enabled. For instance, the deadline aware scheduler may fail to maintain the video buffer occupancy level due to any number of circumstances, such as a failure of the primary network interface, severe congestion associated with the primary network interface, and so forth. In addition, the video buffer occupancy level may fall into a next tier and/or may fall below a low-buffer occupancy threshold, e.g., a 40% occupancy, or some other threshold amount. Thus, in one example, the second threshold may comprise comprises a video buffer occupancy that corresponds to a lowest level of a tier of the video buffer associated with a highest video encoding bitrate that is sustainable in accordance with the combined throughput plus a video chunk duration associated with the first video chunk (e.g., the first video chunk's play-out duration), or may comprise the low-buffer occupancy threshold. Accordingly, when the processor determines that the video buffer occupancy level falls below or is below the second threshold, the processor may disable the deadline aware scheduler (if previously enabled) or maintain the deadline aware scheduler as not currently enabled. In such case, the primary and secondary network interfaces may both be made available and the (client) multipath transport layer module may select network interface(s) for packets in accordance with a base scheduling algorithm.

Following step 455, the method 400 may proceed to step 475 or to one of optional steps 460 or 470. At optional step 460, the processor may receive the first video chunk from the (client) multipath transport layer module. In one example, the video server sends the packets of the first video chunk from a server multipath transport layer module to the (client) multipath transport layer module via the network interface that is selected for each packet of the plurality of packets of the first video chunk.

At optional step 465, the processor may store the first video chunk in the video buffer. For instance, a described above, the processor may aim to maintain the video buffer occupancy level, e.g., within a particular tier and/or above a particular occupancy threshold. Thus, there may be a plurality of additional video chunks that are already stored in the video buffer awaiting play-out on the endpoint device.

At optional step 470, the processor may play a second video chunk from the video buffer. For instance, the second video chunk may be one of a plurality of video chunks previously stored in the video buffer, where the second video chunk may be next in line for play-out.

At step 475, the processor determines of more segments of the video remain to be downloaded and or played-out. If there are additional segments of the video remaining, the method 400 may return to optional step 425, where subsequent steps of the method 400 may be performed with respect to a next video chunk for a next segment of the video. If there are no additional segments of the video, the method 400 may proceed to step 495. At step 495, the method 400 ends.

In addition, it should be noted that although not specifically specified, one or more steps, functions or operations of the method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 may comprise optional steps, or can be combined, separated, and/or performed in a different order from that described above, without departing from the example embodiments of the present disclosure. The method 400 may also be expanded to include additional steps. Thus, these and other modifications are all contemplated within the scope of the present disclosure.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for performing operations of a video client or for performing operations of a video server, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one embodiment, instructions and data for the present module or process 505 for performing operations of a video client or for performing operations of a video server (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for performing operations of a video client or for performing operations of a video server (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
    a processor; and
    a non-transitory computer-readable medium storing a first set of instructions which, when executed by the processor, cause the processor to perform operations of a video client, the operations comprising:

measuring an occupancy of a video buffer;
selecting a first video chunk having a first video encoding bitrate based upon the occupancy of the video buffer;
providing a deadline for a delivery of the first video chunk to a multipath transport layer module;
activating a deadline aware scheduler of the multipath transport layer module when the occupancy of the video buffer exceeds a first threshold and when the deadline aware scheduler was previously disabled; and
deactivating the deadline aware scheduler of the module when the occupancy of the video buffer falls below a second threshold and when the deadline aware scheduler was previously enabled, wherein the multipath transport layer module is for requesting a plurality of packets of the first video chunk from a video server and for selecting a network interface from among at least one active interface of a plurality of network interfaces for the video server to send each packet of the plurality of packets of the first video chunk, wherein the deadline aware scheduler is for selecting whether a secondary network interface of the plurality of network interfaces is to be an active interface or a non-active interface.

2. The device of claim 1, wherein the secondary network interface is selected to be the non-active interface when a throughput of a primary interface of the plurality of network interfaces enables the delivery of the first video chunk within the deadline, and wherein the secondary network interface is selected to be the active interface when the throughput of the primary interface does not enable the delivery of the first video chunk within the deadline.

3. The device of claim 2, wherein the primary interface is set to be an active interface based upon a user input.

4. The device of claim 1, wherein the operations further comprise:
determining the deadline, wherein the determining the deadline comprises setting the deadline to a first time value corresponding to a duration of the first video chunk or corresponding to a size of the first video chunk divided by the first video encoding bitrate of the first video chunk.

5. The device of claim 4, wherein the determining the deadline further comprises:
extending the deadline beyond the first time value to a second time value, wherein the deadline is extended when the occupancy of the video buffer exceeds a third threshold, wherein the third threshold is greater than the first threshold.

6. The device of claim 1, wherein the operations further comprise:
receiving a request for a video;
transmitting the request to the video server; and
receiving a manifest file for the video from the video server, wherein the manifest file identifies a plurality of chunks of the video, the plurality of chunks including the first video chunk, wherein the plurality of chunks includes chunks associated with a same segment of the video but having different video encoding bitrates.

7. The device of claim 1, wherein the operations further comprise:
receiving the first video chunk from the multipath transport layer module, wherein the video server sends the packets of the first video chunk to the multipath transport layer module via the network interface that is selected for each packet of the plurality of packets of the first video chunk;
storing the first video chunk in the video buffer; and
playing a second video chunk from the video buffer.

8. The device of claim 1, wherein the operations further comprise:
receiving a combined throughput for the plurality of network interfaces from the multipath transport layer module, wherein the selecting the first video chunk having the first video encoding bitrate is further based upon the combined throughput.

9. The device of claim 8, wherein the first threshold comprises:
a buffer occupancy associated with a highest video encoding bitrate that is sustainable in accordance with the combined throughput; or
an overall capacity of the video buffer minus a video chunk duration associated with the first video chunk.

10. The device of claim 8, wherein the second threshold comprises a video buffer occupancy that corresponds to a lowest level of a tier of the video buffer associated with a highest video encoding bitrate that is sustainable in accordance with the combined throughput plus a video chunk duration associated with the first video chunk, or a low-buffer occupancy threshold.

11. The device of claim 1, wherein the plurality of network interfaces comprises a first cellular interface and a first non-cellular wireless interface.

12. The device of claim 11, wherein the plurality of network interfaces further comprises at least one of:
a second cellular interface;
a second non-cellular wireless interface; or
a wired interface.

13. The device of claim 1, wherein the computer-readable medium comprises a memory, wherein the first set of instructions is stored in a first portion of the memory.

14. The device of claim 13, wherein the first portion of the memory further includes the video buffer.

15. The device of claim 13, wherein the multipath transport layer module comprises a second set of instructions stored in a second portion of the memory and executed by the processor.

16. The device of claim 15, wherein the first portion of the memory comprises a user space, and wherein the second portion of the memory comprises a kernel space.

17. The device of claim 1, wherein the multipath transport layer module comprises a multi-path transmission control protocol client.

18. The device of claim 1, wherein the video client comprises a dynamic adaptive streaming over hypertext transfer protocol.

19. A non-transitory computer-readable medium storing a first set of instructions which, when executed by a processor, cause the processor to perform operations of a video client, the operations comprising:
measuring an occupancy of a video buffer;
selecting a first video chunk having a first video encoding bitrate based upon the occupancy of the video buffer;
providing a deadline for a delivery of the first video chunk to a multipath transport layer module;
activating a deadline aware scheduler of the multipath transport layer module when the occupancy of the video buffer exceeds a first threshold and when the deadline aware scheduler was previously disabled; and
deactivating the deadline aware scheduler of the multipath transport layer module when the occupancy of the video buffer falls below a second threshold and when the deadline aware scheduler was previously enabled, wherein the multipath transport layer module is for requesting a plurality of packets of the first video chunk from a video server and for selecting a network interface from among at least one active interface of a plurality of network interfaces for the video server to send each packet of the plurality of packets of the first video chunk, wherein the deadline aware scheduler is for selecting whether a secondary network interface of the plurality of network interfaces is to be an active interface or a non-active interface.

20. A method for performing operations of a video client, the method comprising:

measuring, by a processor, an occupancy of a video buffer;

selecting, by the processor, a first video chunk having a first video encoding bitrate based upon the occupancy of the video buffer;

providing, by the processor, a deadline for a delivery of the first video chunk to a multipath transport layer module;

activating, by the processor, a deadline aware scheduler of the multipath transport layer module when the occupancy of the video buffer exceeds a first threshold and when the deadline aware scheduler was previously disabled; and deactivating, by the processor, the deadline aware scheduler of the multipath transport layer module when the occupancy of the video buffer falls below a second threshold and when the deadline aware scheduler was previously enabled, wherein the multipath transport layer module is for requesting a plurality of packets of the first video chunk from a video server and for selecting a network interface from among at least one active interface of a plurality of network interfaces for the video server to send each packet of the plurality of packets of the first video chunk, wherein the deadline aware scheduler is for selecting whether a secondary network interface of the plurality of network interfaces is to be an active interface or a non-active interface.

* * * * *